US012694148B2

(12) United States Patent

Wang et al.

(10) Patent No.: US 12,694,148 B2

(45) Date of Patent: Jul. 28, 2026

(54) METHOD, DEVICE, AND MEDIUM FOR VERIFYING BACKEND INTERFACE

(71) Applicant: Beijing Youzhuju Network Technology Co., Ltd., Beijing (CN)

(72) Inventors: Qingjiang Wang, Beijing (CN); Chen Chen, Beijing (CN); Chao Zhang, Beijing (CN); Jingtian Gu, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 21 days.

(21) Appl. No.: 18/807,563

(22) Filed: Aug. 16, 2024

(65) Prior Publication Data

US 2026/0050686 A1 Feb. 19, 2026

(51) Int. Cl.
G06F 21/62 (2013.01)
G06F 21/53 (2013.01)

(52) U.S. Cl.
CPC .......... G06F 21/6236 (2013.01); G06F 21/53 (2013.01)

(58) Field of Classification Search
CPC .............................. G06F 21/6236; G06F 21/53
See application file for complete search history.

(56) References Cited

U.S. PATENT DOCUMENTS

| | | | |
|---|---|---|---|
| 2006/0026300 A1* | 2/2006 | Rose | H04L 67/565 |
| | | | 709/246 |
| 2019/0104196 A1* | 4/2019 | Li | G06Q 20/3823 |
| 2019/0377557 A1* | 12/2019 | Dibbern | G06F 8/38 |
| 2021/0166245 A1* | 6/2021 | Novotny | H04L 67/1078 |
| 2022/0123999 A1* | 4/2022 | Bar Oz | H04L 43/50 |
| 2022/0244967 A1* | 8/2022 | Xue | G06F 11/36 |
| 2024/0291835 A1* | 8/2024 | Sethi | H04L 63/1425 |

* cited by examiner

*Primary Examiner* — Christopher B Robinson
*Assistant Examiner* — Tania M Pena-Santana
(74) *Attorney, Agent, or Firm* — Alleman Hall LLP

(57) ABSTRACT

Embodiments of the present disclosure provide a method, device, and medium for verifying a backend interface. The method comprises receiving a request associated with the backend interface. The method further comprising generating a mock response based on the request and a mock rule corresponding to the backend interface, where the mock rule is received through a user interface. The method further comprises obtaining an assertion rule corresponding to the backend interface, where the assertion rule is received through the user interface. In addition, the method further comprises generating a verification result for display based on the mock response and the assertion rule.

20 Claims, 8 Drawing Sheets

400

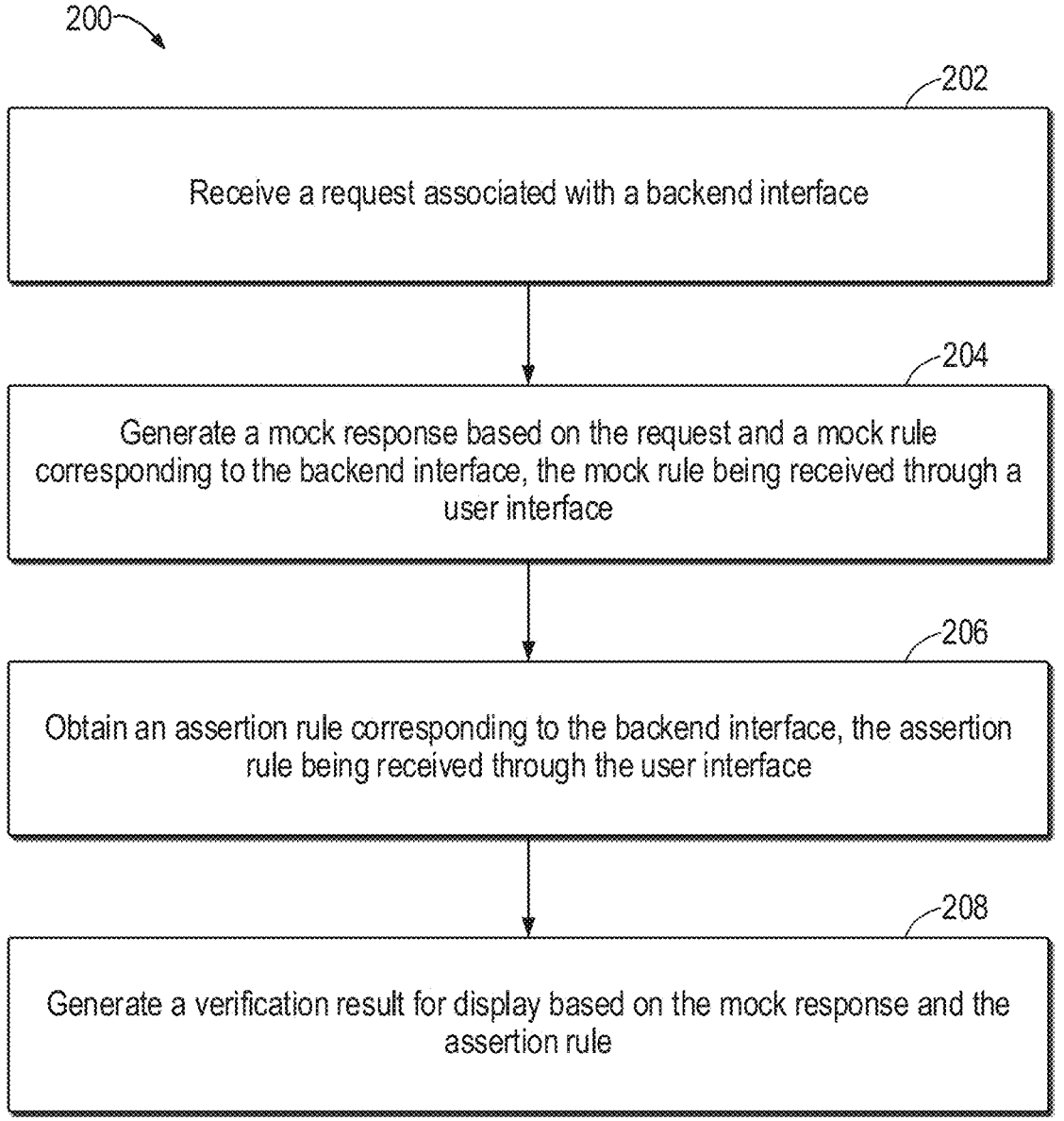

200

202

Receive a request associated with a backend interface

204

Generate a mock response based on the request and a mock rule corresponding to the backend interface, the mock rule being received through a user interface

206

Obtain an assertion rule corresponding to the backend interface, the assertion rule being received through the user interface

208

Generate a verification result for display based on the mock response and the assertion rule

*FIG. 2*

METHOD, DEVICE, AND MEDIUM FOR VERIFYING BACKEND INTERFACE

BACKGROUND

A backend interface refers to a set of methods, endpoints, or services provided by the backend of an application that allows other parts of the system (such as the frontend, other services, or external systems) to interact with it. The backend interface serves as the communication layer between the backend and its consumers, defining how requests are made to the backend and how data or responses are returned.

Application Programming Interface (API) exposes specific endpoints (e.g., uniform resource locators, URLs) that clients can call to perform operations like retrieving data, submitting data, or triggering specific backend processes. An endpoint is a specific path or URL on the backend server where a particular service or resource can be accessed. Each endpoint is associated with a specific HTTP method (GET, POST, PUT, DELETE, etc.) that defines the action to be performed. The backend interface defines the structure of the requests that clients must send and the format of the responses they will receive. This often involves using data formats like JSON, XML, or protocol buffers.

SUMMARY

In a first aspect according to some embodiments of the present disclosure, a method for verifying a backend interface is provided. The method comprises receiving a request associated with the backend interface. The method further comprising generating a mock response based on the request and a mock rule corresponding to the backend interface, where the mock rule is received through a user interface. The method further comprises obtaining an assertion rule corresponding to the backend interface, where the assertion rule is received through the user interface. In addition, the method further comprises generating a verification result for display based on the mock response and the assertion rule.

In a second aspect according to some embodiments of the present disclosure, an electronic device comprising a memory and a processor is provided. The memory is configured to store computer instructions which, when executed by the processor, cause the processor to receive a request associated with the backend interface. The instructions further cause the processor to generate a mock response based on the request and a mock rule corresponding to the backend interface, where the mock rule is received through a user interface. The instructions further cause the processor to obtain an assertion rule corresponding to the backend interface, where the assertion rule is received through the user interface. In addition, the instructions further cause the processor to generate a verification result for display based on the mock response and the assertion rule.

In a third aspect according to some embodiments of the present disclosure, a non-transitory computer-readable medium is provided. The medium comprises instructions stored thereon which, when executed by a processor, cause the processor to receive a request associated with the backend interface. The instructions further cause the processor to generate a mock response based on the request and a mock rule corresponding to the backend interface, where the mock rule is received through a user interface. The instructions further cause the processor to obtain an assertion rule corresponding to the backend interface, where the assertion rule is received through the user interface. In addition, the instructions further cause the processor to generate a verification result for display based on the mock response and the assertion rule.

Any of the one or more above aspects in combination with any other of the one or more aspects. Any of the one or more aspects as described herein. This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Embodiments of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with reference to the following figures.

FIG. 2 is a flow chart illustrating an example process of verifying a backend interface according to some embodiments of the present disclosure;

DETAILED DESCRIPTION

Figure 1:
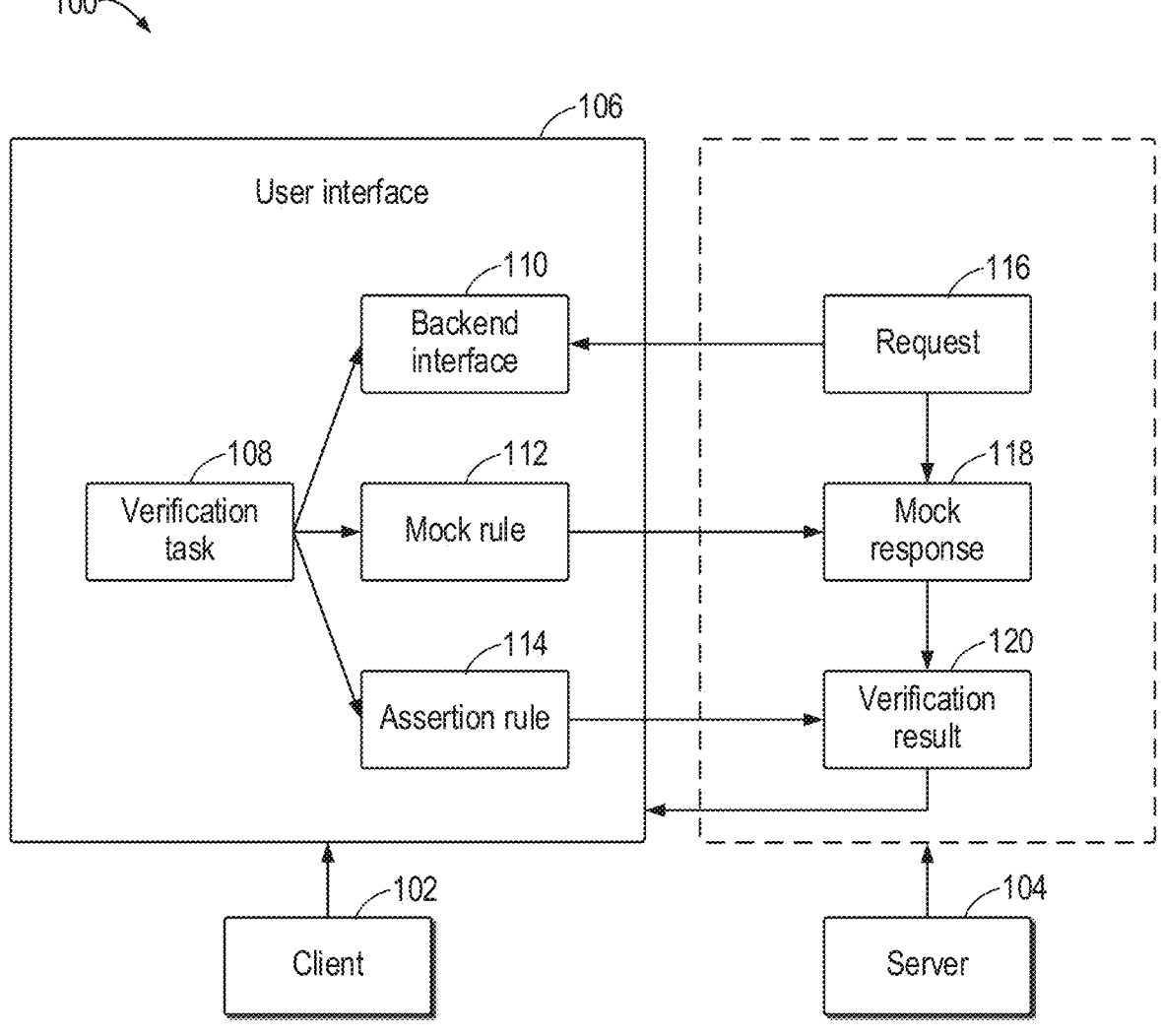
FIG. 1 illustrates an example environment in which example embodiments of the present disclosure may be implemented.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents. A plurality of steps recorded in method implementations in the present disclosure may be performed in different orders and/or in parallel. In addition, additional steps may be included and/or the execution of the illustrated steps may be omitted in the method implementations. The scope of the present disclosure is not limited in this aspect.

The term "including" used herein and variations thereof are an open-ended inclusion, namely, "including but not limited to". The term "based on" is interpreted as "at least partially based on". The term "an embodiment" means "at least one embodiment"; the term "another embodiment" means "at least one additional embodiment"; and the term "some embodiments" means "at least some embodiments". The related definitions of other terms will be provided in the subsequent description. Concepts such as "first" and "second" mentioned in the present disclosure are only for distinguishing different apparatuses, modules, or units, and are not intended to limit the order or relation of interdependence of functions performed by these apparatuses, modules, or units. Variants of "one" and "a plurality of" mentioned in the present disclosure are illustrative and not restrictive, and those skilled in the art should understand that unless otherwise explicitly specified in the context, the modifiers should be understood as "one or more". The names of messages or information exchanged between apparatuses in the implementations of the present disclosure are provided for illustrative purposes only, and are not used to limit the scope of these messages or information. Data (including the data itself, and data acquisition, or usage) involved in the technical solutions should comply with the requirements of corresponding laws and regulations, and relevant stipulations.

In web application development, the interface communication between the frontend and the backend is important. Ensuring the accuracy and stability of the backend interfaces is a key aspect of frontend testing. Within the field of frontend quality assurance, automated testing frameworks are commonly used. These frameworks typically involve multiple steps, comprising writing test scripts that use APIs of the framework is used to simulate user interactions, capture webpage data, verify page elements, and validate interface data; manually creating mock data and logic to substitute real data when interfaces are unavailable; embedding data validation logic in the test scripts to ensure that the interface response data meets expectations, such as correct data types, value ranges, and required fields; running the test scripts and analyzing the test results through console output or log files.

However, traditional schemes have several shortcomings. For example, writing test scripts requires developers to have a certain level of programming skill and knowledge of the testing framework. The cost of maintaining these scripts is high, especially when applications undergo frequent updates and iterations. Manually creating and managing mock data and logic adds complexity and is prone to errors. Updating and maintaining mock data requires additional time and effort. Furthermore, traditional test results are often presented in the form of console outputs or log files, making them difficult to view and analyze intuitively. There is a lack of a unified interface to display all requests and responses from the interfaces and to indicate whether they passed predefined validation rules. In addition, modifying and extending test rules requires rewriting and redeploying code, which lacks flexibility. Additional tools and steps are needed to achieve complex testing requirements, such as dynamically generating mock data and real-time data visualization.

Therefore, the embodiments of the present disclosure provide a scheme for verifying a backend interface. In the provided scheme, a device may receive a request associated with the backend interface. Then, the device may generate a mock response based on the request and a mock rule corresponding to the backend interface, where the mock rule is received through a user interface. Furthermore, the device may obtain an assertion rule corresponding to the backend interface, where the assertion rule is received through the user interface. In addition, the device may generate a verification result for display based on the mock response and the assertion rule.

In this way, by utilizing mock rules, mock responses can be generated automatically, thereby the efficiency of generating and managing the mock responses can be improved. Furthermore, by creating mock rules and assertion rules through the user interface, a user can create test cases without writing test scripts, thereby the difficulty of creating test cases can be reduced, and the time spent on writing and debugging the test scripts can be saved.

FIG. 1 illustrates an example environment 100 in which example embodiments of the present disclosure may be implemented. As shown in FIG. 1, the environment 100 includes a client 102 and a server 104. The client 102 may be any device having processing ability and interactive ability, such as a personal computer, a laptop computer, a tablet, a smart telephone, a personal assistant, or a smart wearable device, etc. The server 104 may be any device having processing ability, such as a local server, an on-premises server, a cloud server, or a dedicated server, etc.

In the environment 100, an application with a user interface (UI) 106 may run on the client 102, and the UI 106 may be displayed on a display unit of the client 102. When a user (e.g., a test engineer) needs to test or verify a backend interface (e.g., a backend for frontend interface), the user may create a verification task 108 through the UI 106, where the verification task 108 is associated with a backend interface 110. For example, the backend interface 110 may be an interface for checking the current weather. The backend interface 110 may communicate with a third-party weather API to fetch weather data based on a city name provided in a request from a frontend.

In the environment 100, the user may configure the verification task 108 through the UI 106. For example, the user may add a mock rule 112 into the verification task 108 through the UI 106. In some implementations, the mock rule 112 may include a header rule and a body rule used for generating a mock response. Mocking refers to a process of replacing real objects with simulated objects during testing. These simulated objects (also refer to as mocks or mock data herein) mimic the behavior of the real objects but are controlled and predictable. This allows a test engineer to test specific parts of code without relying on external dependencies like databases, APIs, or other services.

In the environment 100, the user may further add an assertion rule 114 into the verification task 108 through the UI 106. An assertion is a process of verifying that a certain condition or expression is true. In other words, the assertion is used to check that the output of code matches an expected result. If an assertion fails, it indicates that there is a problem in the code, and the test will fail. In some implementations, the user may configure the assertion rule 114 by setting a data type, a data source, a data path, a verification rule and an expected value of the assertion rule 114 through the UI 106. The data type indicates whether data to be verified is a request or a response. The data source indicates whether a source of the data to be verified is headers, body, or query parameters. The data path indicates a path of the data to be verified. The verification rule indicate a verification operation, for example, "equal to", "not equal to", "is empty", "contains", etc. The verification rule may be applied to the data to be verified and the expected value. If the data to be verified and the expected value satisfy the verification rule, the assertion may pass.

After the user configures the verification task 108, the server 104 may verify the backend interface 110 based on the mock rule 112 and the assertion rule 114. In the environment 100, the server 104 may receive a request 116 associated with the backend interface 110. For example, the request 116 may include a query parameter with a key as "city" and a value as "Beijing". The request 116 may call the backend interface 110 to check the weather in Beijing. However, the user may do not want to call a third-party API to obtain the current weather in Beijing. Thus, the server 104 may generate a mock response 118 (e.g., a simulated weather in Beijing) based on the mock rule 112 configured by the user through the UI 106. Then, the server 104 may generate a verification result 120 based on the mock response 118 and the assertion rule 114 configured by the user through the UI 106.

For example, the server 104 may determine the data to be verified, a verification rule, and an expected value based on the assertion rule 114. For example, the data to be verified may be a temperature field in the mock response 118, the verification rule may be "equal to", and the expected value may be "25 degrees". If the temperature in the mock response 118 is equal to 25 degrees, the assertion may pass, and the verification result 120 may be successful. Otherwise, if the temperature in the mock response 118 is not equal to 25 degrees, the assertion may fail, and the verification result 120 may be unsuccessful.

In the environment 100, the verification result 120 may be transmitted to the client 102, such that the client 102 may display the verification result 120 on the UI 106. In some implementations, the client 102 may obtain multiple verification results for multiple backend interfaces and display these verification results on one page of the UI 106. Therefore, the user can easily view the verification results of these backend interface.

In this way, the user can create a verification task 108 by configuring the mock rule 112 and the assertion rule 114 for the backend interface 110 through the UI 106 without writing test scripts, thereby the difficulty of creating test cases can be reduced, and the time spent on writing and debugging the test scripts can be saved. Furthermore, by utilizing mock rules, mock responses can be generated automatically, thereby the efficiency of generating and managing the mock responses can be improved.

FIG. 2 is a flow chart illustrating an example process 200 of verifying a backend interface according to some embodiments of the present disclosure. The example process 200 may be implemented by a computing device. For example, the computing device may be the server 104 in FIG. 1. As shown in FIG. 2, at block 202, the computing device may receive a request associated with a backend interface. For example, as shown in FIG. 1, to verify the backend interface 110, a verification task 108 may be created through the UI 106 on the client 102. The server 104 may receive a request 116 associated with the backend interface 110. For example, the request 116 may include a query parameter with a key and a value. The request 116 may call the backend interface 110 to obtain a response.

At block 204, the computing device may generate a mock response based on the request and a mock rule corresponding to the backend interface, where the mock rule is received through a user interface. For example, as shown in FIG. 1, the server 104 may determine that the verification task 108 is configured with a mock rule 112. Then, the server 104 may generate a mock response 118 instead of a real response based on the mock rule 112. For example, the body of the mock response 118 may include simulated values. Furthermore, the mock rule 112 is configured by the user through the UI 106 on the client 102.

At block 206, the computing device may obtain an assertion rule corresponding to the backend interface, where the assertion rule is received through the user interface. For example, as shown in FIG. 1, the server 104 may obtain the assertion rule 114 corresponding to the backend interface 110. The assertion rule 114 may include rules or parameters for determining the data to be verified. For example, the body of the mock response 118 may include multiple key-value pairs. The assertion rule 114 may specify a data type (e.g., response), a data source (e.g., body), and a data path (e.g., a path indicating a particular key in the body) to locate the data to be verified. Furthermore, the assertion rule 114 may also specify a verification rule (e.g., "equal to") and an expected value (e.g., "25 degrees").

At block 208, the computing device may generate a verification result for display based on the mock response and the assertion rule. For example, as shown in FIG. 1, the server 104 may generate the verification result 120 based on the mock response 118 and the assertion rule 114. For example, the server 104 may determine that the data to be verified is a temperature field in the body of the mock response 118 based on the data type, the data source and the data path. Furthermore, the server 104 may determine that the verification rule in the assertion rule 114 is "equal to", and the expected value in the assertion rule 114 is "25 degrees". If the temperature in the mock response is equal to 25 degrees, the assertion may pass, and the verification result 120 may be successful. Otherwise, if the temperature in the mock response is not equal to 25 degrees, the assertion may fail, and the verification result 120 may be unsuccessful. In addition, the verification result 120 may be transmitted to the client 102, such that the client 102 may display the verification result 120 on the UI 106.

In this way, the user can create a verification task by configuring the mock rule and the assertion rule for the backend interface through the user interface without writing test scripts, thereby the difficulty of creating test cases can be reduced, and the time spent on writing and debugging the test scripts can be saved. Furthermore, by utilizing mock rules, mock responses can be generated automatically, thereby the efficiency of generating and managing the mock responses can be improved.

In some implementations, when the mock response is generated based on the request and the mock rule corresponding to the backend interface, a proxy rule corresponding to the backend interface may be obtained, where the proxy rule indicates an actual destination to which the request is sent, and the proxy rule is received through the user interface. In some implementations, it is determined that the actual destination is an isolation environment based on the proxy rule. A path of the backend interface may be modified to access the isolation environment. A response from the isolation environment may be generated based on the request. A verification result may be generated based on the response and the assertion rule.

In some implementations, the mock rule received through the user interface may comprise a mock header and a mock body. In some implementations, when the verification result is generated for display based on the mock response and the assertion rule, a plurality of assertion rules corresponding to the backend interface may be obtained, where the plurality of assertion rules is received through the user interface, and the plurality of assertion rules comprise the assertion rule. Then, the backend interface may be verified if all assertion rules pass. In some implementations, the assertion rule received through the user interface may comprise at least one of: a data type indicating whether data to be verified is a request or a response, a data source indicating whether a source of the data to be verified is headers, body, or query parameters, a data path indicating a path of the data to be verified, a verification rule indicating a verification operation, or an expected value.

Figure 3:
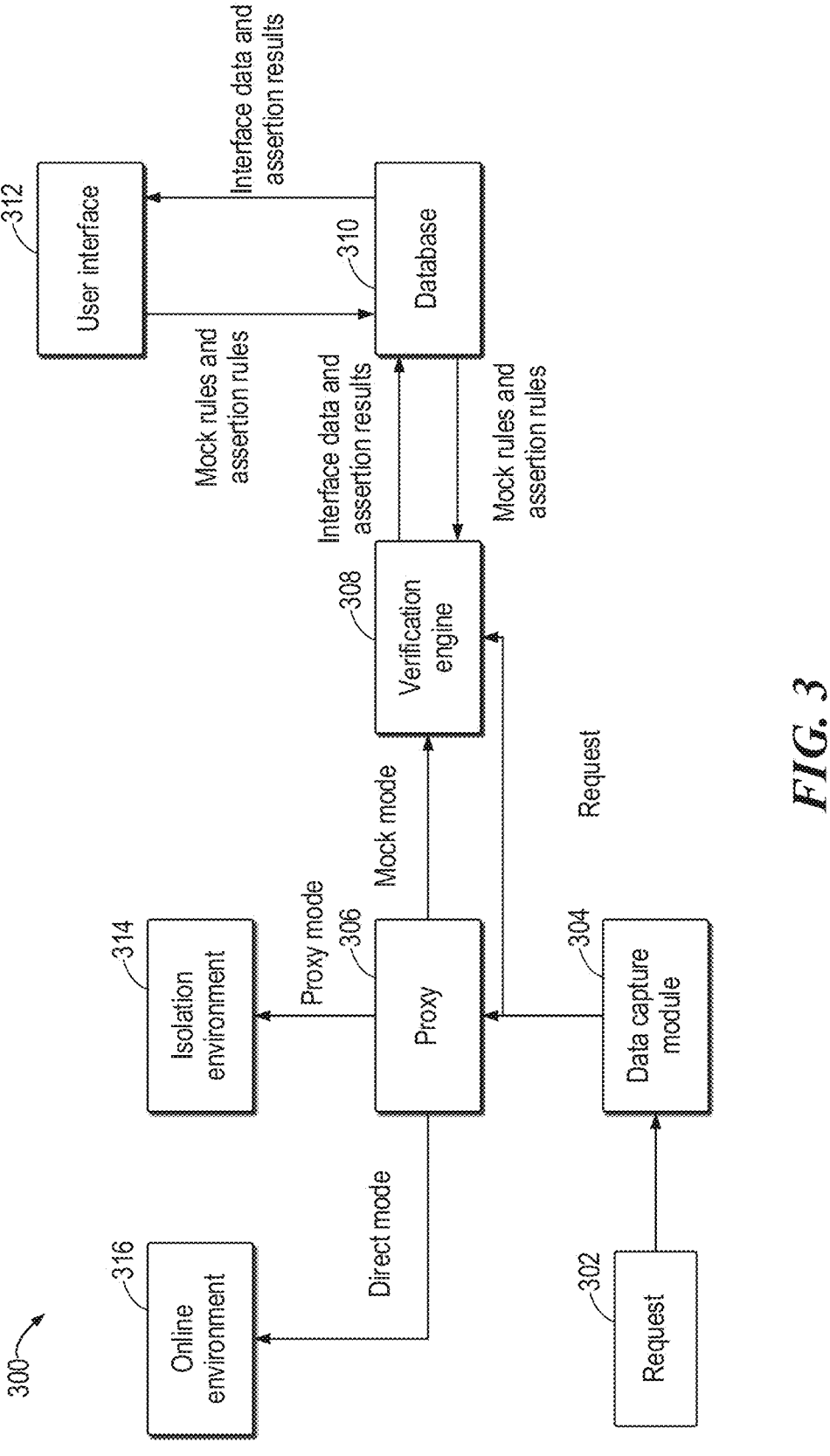
FIG. 3 is a schematic diagram illustrating an example system for verifying a backend interface according to some embodiments of the present disclosure.

FIG. 3 is a schematic diagram illustrating an example system 300 for verifying a backend interface according to some embodiments of the present disclosure. As shown in FIG. 3, the system 300 may include a data capture module 304, a proxy 306, a verification engine 308, a database 310, a UI 312, an isolation environment 314, and an online environment 316. As shown in FIG. 3, a user may configure mock rules and assertion rules through the UI 312. Then, the configured mock rule and assertion rule may be stored in the database 310. Furthermore, the database 310 may also store interface data and assertion results generated by the verification task. These interface data (e.g., the requests and the responses) and assertion results may be obtained from the database 310 and displayed on the UI 312.

An example structure of the assertion rule is showed as below:

```
{
    "_id": "",
    "description": "",
    "msg_type": "request",
    "assert": "",
    "assert_path": "",
    "expected_value": [ ],
    "comparison": ""
}
```

Where "description" represents a description of the purpose or the scenario of the assertion rule, which helps understand the context of the assertion rule; "msg_type" represents whether the request or the response is to be verified; "assert" represents a source of the data to be verified (e.g., URL, method, headers, body, etc.); "assert_path" represents the path of the data to be verified; "expected_value" represents a list of expected values, where the expected values support regular expressions, if the data to be verified matches any value in the list, the assertion rule will pass; and "comparison" represents a verification rule.

For example, supported verification rules are showed in Table 1 at below. Furthermore, the verification rules may be combined or embedded to meet the needs of most scenarios.

TABLE 1

| Verification rule | Annotation |
|---|---|
| equal_to | The data to be verified is equal to the expected value |
| not_equal_to | The data to be verified is not equal to the expected value |
| contains | The data to be verified contains the expected value |
| not_contains | The data to be verified does not contain the expected value |
| regex | The data to be verified matches the expected |

TABLE 1-continued

| Verification rule | Annotation |
|---|---|
| | value by applying a regular expression |
| greater_than | The data to be verified is greater than the expected value |
| less_than | The data to be verified is less than the expected value |
| range [ ] | The data to be verified falls in the range |
| empty | The data to be verified is empty |
| not_empty | The data to be verified is not empty |

In some implementations, the database 310 may be a MongoDB. The document model of MongoDB is more flexible than the traditional relational model, making it possible to store complex data types and nested documents, thereby improving the efficiency of data structure adjustment. Furthermore, MongoDB supports horizontal expansion through sharding, such that it is suitable for processing large-scale data sets. MongoDB can provide high-performance document read and write operations, especially when processing a large number of read and write requests, its performance is better. In addition, MongoDB supports advanced features such as full-text search and conditional query, and does not have high consistency requirements.

In the system 300, a request 302 corresponds to the backend interface to be verified. An example structure of the request 302 is showed as below:

```
"request": {
    "url": "",
    "method": "",
    "headers": "",
    "body": "",
    "query_params": "",
    "timestamp": "",
    "client_ip": "",
    "user_agent": "",
    "cookies": "",
    "env": ""
}
```

Where "url" represents a URL of the request; "method" represents a method of HTTP (e.g., GET, POST, etc.); "headers" represents header information of the request, which may be stored in a form of key-value pairs; "body" represents body information of the request; "query_params" represents query parameters of the request, which may be stored in a form of key-value pairs; "timestamp" represents the time when the request was initiated; "client_ip" represents an IP address of the client that initiates the request; "user_agent" represents a user agent string of the client, which helps identify the device type and the browser of the request initiator; "cookies" represents information about a user session or preferences across multiple requests; and "env" represents environment variables.

In the structure of the request, "url", "method", "headers", "body", and "query_params" may be used to determine whether the request matches the backend interface to be verified. For example, the system 300 may determine the request matches the backend interface to be verified when the values of "url", "method", "headers", "body", and "query_params" match values specified in one or more matching rules corresponding to the backend interface.

As shown in FIG. 3, when the system 300 receives a request 302, the data capture module 304 may intercept the request 302, and communicate with the proxy 306 to determine an actual destination for the request 302. In the system 300, the actual destination of the request 302 may be determined based on a proxy rule configured by the user. In a case that the proxy rule is a direct mode, the request 302 may be transmitted to the online environment 316, and the backend interface may return a response based on the real data in the online environment 316. An example structure of the response is showed as below:

```
"response": {
    "status": "",
    "headers": "",
    "body": "",
    "timestamp": "",
    "is_mock": "",
    "env": "",
    "duration": "",
    "delay": ""
}
```

Where "status" represents a HTTP status code (e.g., 200, 404, etc.); "headers" represents header information of the response, which may be stored in a form of key-value pairs; "body" represents body information of the response; "timestamp" represents the time when the response was generated; "is_mock" represents that the response is a mock response or a real response; "env" represents environment variables; "duration" represents the duration (e.g., in milliseconds) from the start of the request to the end of the response, which is helpful for performance analysis; and "delay" represents the delay time during the mock process.

In a case that the proxy rule is a proxy mode, the destination of the request 302 may be redirected to the isolation environment 314. For example, a path of the backend interface may be modified to access the isolation environment 314. The isolation environment 314 is a controlled setup where tests are conducted in a way that ensures they do not interfere with other processes, data, or tests. This environment may be designed to be independent of external factors, providing a consistent and predictable space for testing. Therefore, the isolation environment 314 may mimic the conditions of the actual online environment 316 as closely as possible, while still being separate from it, to prevent unintended side effects and to ensure accurate test results.

In a case that the proxy rule is a mock mode, the back interface may return a mock response. As shown in FIG. 3, the request 302 may be transmitted to the verification engine 308. The verification engine 308 may verify the backend interface based on the mock rules and the assertion rules configured through the UI 312. For example, the verification engine 308 may obtain a mock rule and an assertion rule corresponding to the backend interface associated with the request 302. The verification engine 308 may generate a mock response for the request 302 based on the mock rule. Then, the verification engine 308 may verify the backend interface based on the mock response and the assertion rule, and generate an assertion result corresponding to the assertion rule. If the verification task only includes one assertion rule, the verification result may be successful if the assertion result is passed. In some implementation, the verification task may include multiple assertion rules, the verification result may be successful if all assertions rules are passed. In other words, the verification task may be unsuccessful if any of the multiple assertion rules corresponding to the backend interface is failed.

An example structure of a set of assertion rules is showed as below:

```
{
    "space_id": "",
    "step_id": "",
    "assert_rules": {"rules": [{"rules_id": [ ],
    "relation": ""}], "relation": ""},
    "mock_rules": {"rules": [ ]}
}
```

Where "space_id" represents an identification of the test space; "step_id" represents an identification of the verification step; "assert_rules" represents a set of assertion rules; and "mock_rules" represents a set of mock rules.

As shown in FIG. 3, the system 300 may store the interface data (e.g., data related to the request 302 and the response), the assertion results, and the verification result into the database 310. Therefore, the UI 312 may obtain the interface data, the assertion results, and the verification result from the database 310, and display these data to the user.

The core service of the system 300 is the verification engine 308. The verification engine 308 is computationally intensive and network input/output intensive. Furthermore, the verification engine 308 needs to facilitate horizontal expansion, be unaware of task completion, have no consistency requirements, and do not require synchronization. In addition, the verification engine 308 needs to support high availability and high concurrency. Therefore, in some implementations, Java and Remote Procedure Call (RPC) protocol may be used as the programming language and communication protocol for the verification engine 308. Java has a strong big data support ecosystem, is closely integrated with databases, supports ORM, and offers robust computing capabilities for performing assertion calculations on data. Compared to the HTTP protocol, the RPC protocol is faster, offers higher data compression, is more stable, and has lower latency.

Figure 4:
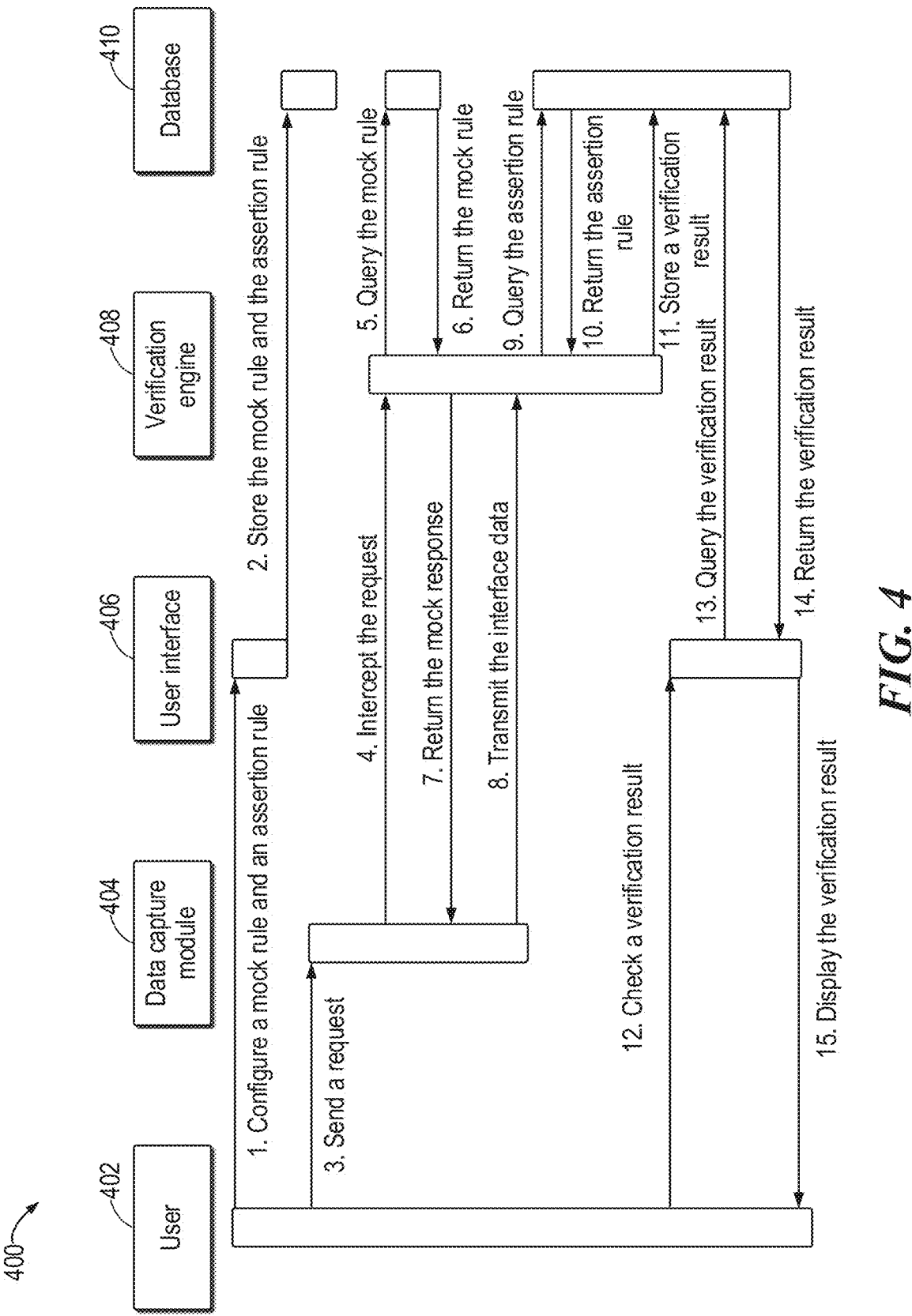
FIG. 4 is a schematic diagram illustrating an example process of interaction between parties in an example system for verifying a backend interface according to some embodiments of the present disclosure.

FIG. 4 is a schematic diagram illustrating an example process 400 of interaction between parties in an example system for verifying a backend interface according to some embodiments of the present disclosure. As shown in FIG. 4, the process 400 involves a user 402, a data capture module 404 (e.g., the data capture module 304 in FIG. 3), a UI 406 (e.g., the UI 312 in FIG. 3), a verification engine 408 (e.g., the verification engine 308 in FIG. 3), and a database 410 (e.g., the database 310 in FIG. 3).

At step 1, the user 402 may configure a mock rule and an assertion rule for verifying a backend interface through the UI 406. At step 2, the mock rule and the assertion rule may be stored into the database 410. At step 3, the user 402 may send a request used for verifying the backend interface. At step 4, the data capture module 404 may intercept the request, and transmit the request to the verification engine 408. At step 5, the verification engine 408 may query the database 410 to retrieve the stored mock rule. In some implementations, a plurality of mock rules may be preloaded from the database 410, and the mock rule may be obtained from the pre-loaded plurality of mock rules. In this way, the time spent on interactions between the verification engine 408 and the database 410 can be reduced.

At step 6, the database 410 may return the stored mock rule to the verification engine 408. At step 7, the verification engine 408 may generate a mock response based on the mock rule, and return the mock response to the data capture module 404. At step 8, the data capture module 404 may transmit the interface data to the verification engine 408, where the interface data may include data related to the request (e.g., URL, method, query parameters, etc.) and data related to the response (e.g., status, header, body, duration, delay, etc.).

At step 9, the verification engine 408 may query the database 410 to retrieve the stored assertion rule. At step 10, the database 410 may return the stored assertion rule to the verification engine 408. At step 11, the verification engine may generate an assertion result based on the mock response and the assertion rule. Furthermore, the verification engine may generate a verification result based on one or more assertion results. Then, the verification engine may store the assertion result and the verification result into the database 410. At step 12, the user 402 may trigger an event of checking the verification result and the assertion rules on the UI 406. At step 13, the UI 406 (or the client on which the UI 406 runs) may query the database 410 to retrieve the verification result and the assertion result associated with the verification task. At step 14, the database 410 may return the verification result and the assertion result to the UI 406. At step 15, the UI 406 may display the verification result and the assertion result to the user 402.

In this way, the user 402 can create a verification task by configuring the mock rule and the assertion rule for the backend interface through the UI 406 without writing test scripts, thereby the difficulty of creating test cases can be reduced, and the time spent on writing and debugging the test scripts can be saved.

In some implementations, to improve the information security of the assertion rule and the mock rule, the assertion rule and the mock rule may comprise encoded data. A piece of code for decoding the encoded data in the assertion rule or the mock rule may be obtained, where the piece of code is received through the user interface. The encoded data in the assertion rule or the mock rule may be decoded using the piece of code. In some implementations, a hash value for rules associated with a verification task may be generated based on an identification of a verification step and an identification of the verification task. The rules associated with the verification task may be loaded into a part of instances of verification engine. The verification task may be performed on the part of instances of verification engine based on the loaded rules.

Figure 5:
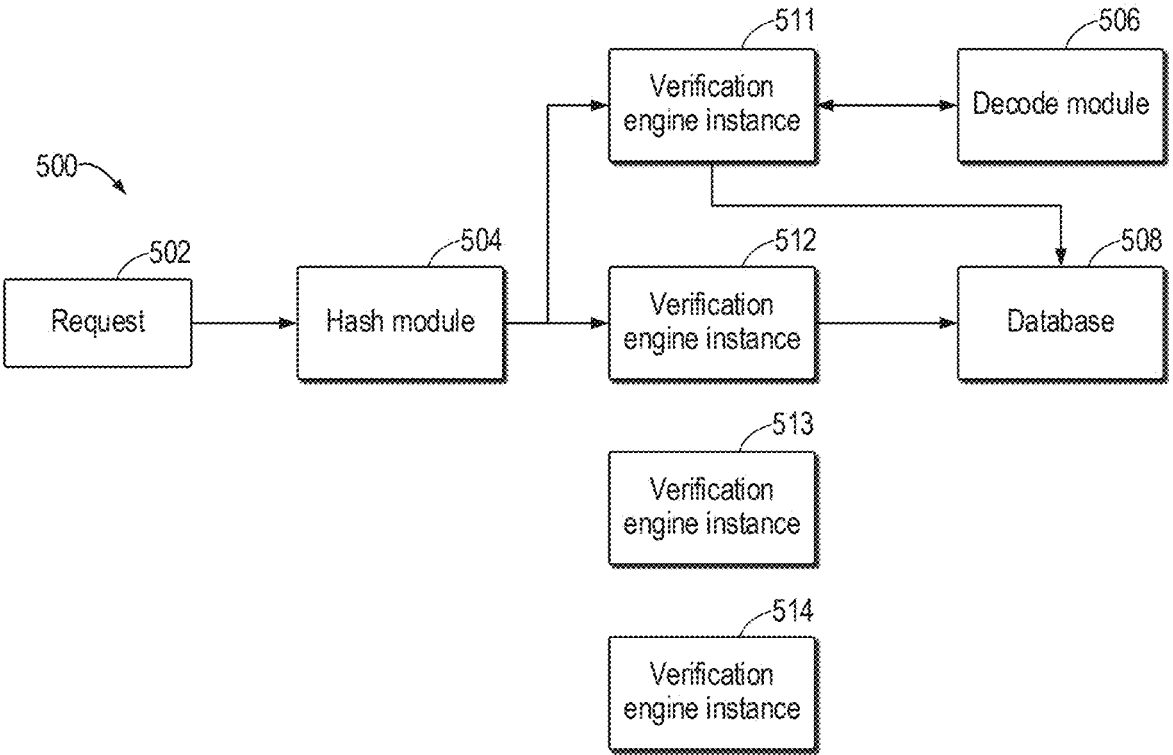
FIG. 5 is a schematic diagram illustrating an example of distributed verification engines according to some embodiments of the present disclosure.

FIG. 5 is a schematic diagram illustrating an example 500 of distributed verification engines according to some embodiments of the present disclosure. As shown in FIG. 5, the example 500 may include multiple instances of verification engine, e.g., verification engine instances 511, 512, 513, and 514. Each of these verification engines can perform verification steps (e.g., the steps related to the verification engine described in FIG. 4). Therefore, the verification steps from several verification tasks may be distributed onto the multiple verification engine instances, thereby the efficiency of the system can be improved. In order to determine a match between the verification task and the received request, each verification task may be configured with several matching rules. If the received request meets any of the matching rules of a particular verification task, the verification engine instance may determine that the request matches the particular verification task. Then, the verification engine instance may obtain several pre-loaded assertion rules and the mock rule associated with the particular verification task to verify the backend interface associated with this verification task. However, if each of the verification engine instances loads matching rules, assertion rules, and mock rules of all verification task, the load of each verification engine instance may be heavy.

Therefore, the hash module 504 may generate a hash value for the rules associated with a verification task based on an identification of a verification step and an identification of the verification task. Then, the rules with the same hash value may be loaded from database 508 to a part of the verification engine instances, for example, the verification engine instances 511 and 512. When the system receives a request 502, the request 502 may satisfy a matching rule loaded by the verification engine instances 511 and 512. Then, the verification task corresponding to the request 502 may be performed on the verification engine instance 511 and 512 using loaded assertion rules and a mock rule.

In this way, each verification engine instance may load rules associated with a part of verification tasks instead of rules associated with all verification tasks. Thus, the load of the verification engine instance can be reduced.

In the example 500, to improve the information security, data in the rules may be encoded. Therefore, the user may provide a piece of code for decoding the encoded data through the user interface. The decode module 506 may decode the rules using the code provided by the user. This process may be performed in an encrypted manner. In this way, the data can be provided to the system in cipher text, thereby the information security can be improved.

In some implementations, when the mock response is generated based on the request and the mock rule corresponding to the backend interface, it may be determined that the request matches the backend interface based on a matching rule. Then, the mock rule corresponding to the backend interface may be obtained. The mock response may be generated based on the request and the mock rule. In some implementations, a plurality of matching rules, a plurality of assertion rules and a mock rule corresponding to the backend interface may be obtained, where the plurality of matching rules being received through the user interface. It may be determined that the request matches the backend interface in response to any of the plurality of matching rules being satisfied.

Figure 6:
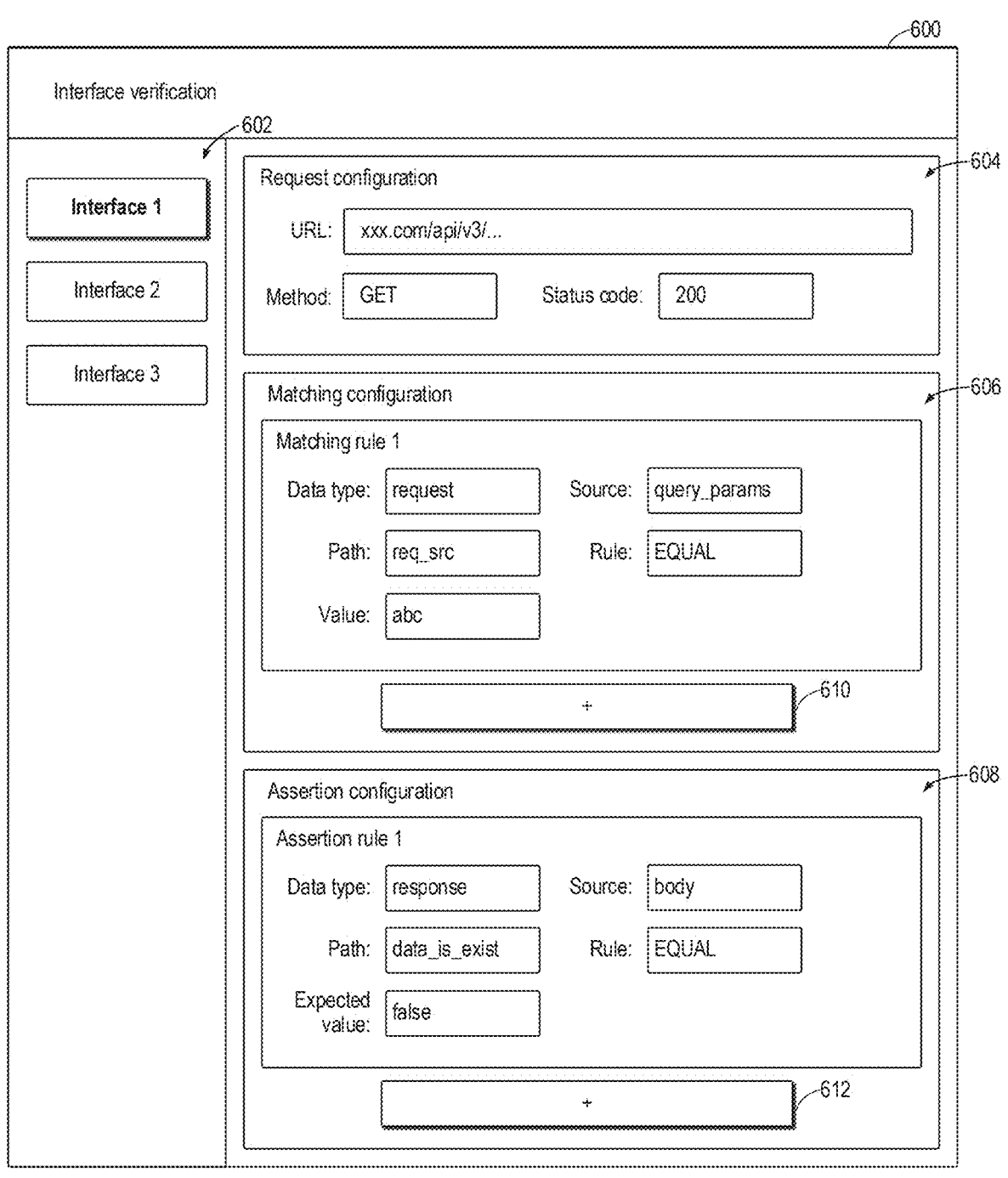
FIG. 6 is a schematic diagram illustrating an example UI for interface verification configuration according to some embodiments of the present disclosure.

FIG. 6 is a schematic diagram illustrating an example UI 600 for interface verification configuration according to some embodiments of the present disclosure. As shown in FIG. 6, the UI 600 may include an area 602 for displaying a list of backend interfaces, an area 604 for request configuration, an area 606 for matching configuration, and an area 608 for assertion configuration. In the area 602, all backend interfaces to be verified may be displayed, such that the user may configure one of the backend interfaces by triggering a control corresponding to this backend interface. For example, as shown in FIG. 6, a control corresponding to an interface 1 is triggered. Then, a plurality of configurable fields may be filled with values corresponding to the interface 1.

In the area 604, the user may configure information of request corresponding to the interface 1. For example, the user may configure a URL, a method, and a status code for the request corresponding to the interface 1. Therefore, when the server receives a request, the server may associate the received request with the interface 1 if their URLs, methods, and status codes match.

In the area 606, one or more matching rules may be configured. For example, as shown in FIG. 6, a matching rule 1 has been created. The user may configure a data type, a data source, a data path, a rule (i.e., a matching operation), and a matching value for a request or a response to be verified. For example, the server may receive multiple requests and multiple response (e.g., including mock responses and real responses) corresponding to the interface 1. Then, the server may determine that one of the multiple requests or one of the multiple is to be verified if the request or the response matches the matching rule 1. In the example of UI 600, if a request corresponding to the interface I has a query parameter "req_src", and a value of the parameter "req_src" is equal to "abc", this request may be determined as a request to be verified.

Furthermore, the user may add a new matching rule (e.g., a matching rule 2) into the set of matching rules of the interface I by triggering a control 610. Therefore, if a request or a response matches any of the matching rule 1 and the matching rule 2, the server may determine that this request or response is to be verified.

In the area 608, one or more assertion rules may be configured. For example, as shown in FIG. 6, an assertion rule 1 has been created. The user may configure a data type, a data source, a data path, a verification rule, and an expected value for a request or a response to be verified. The server may determine an assertion result based on the request or the response to be verified and the assertion rule 1. In the example of UI 600, if a response corresponding to the interface 1 and matching the matching rule 1 has a key "data_is_exist" in its body, and a value of the key "data_i-s_exist" is equal to "false", this response may pass the assertion rule 1. Otherwise, if the response does not has a key "data_is_exist" in its body or a value of the key "data_is_exist" is not equal to "false", the assertion rule 1 may fail.

Furthermore, the user may add a new assertion rule (e.g., an assertion rule 2) into the set of assertion rules of the interface 1 by triggering a control 612. Therefore, if a request or a response to be verified passes all assertion rules (i.e., the request or response passes the assertion rule 1 and passes the assertion rule 2), a verification result for this request or response may be successful. Otherwise, if any of the assertion rules fails, a verification result for this request or response may be unsuccessful. In addition, if verification results for all requests and responses to be verified are successful, a verification result for the interface I may be successful.

In this way, the user may configure matching rules and assertion rules for backend interfaces through the UI 600 without writing test scripts, thereby the efficiency of creating test cases can be improved, and the efficiency of managing and modifying the test cases can be improved also.

Figure 7:
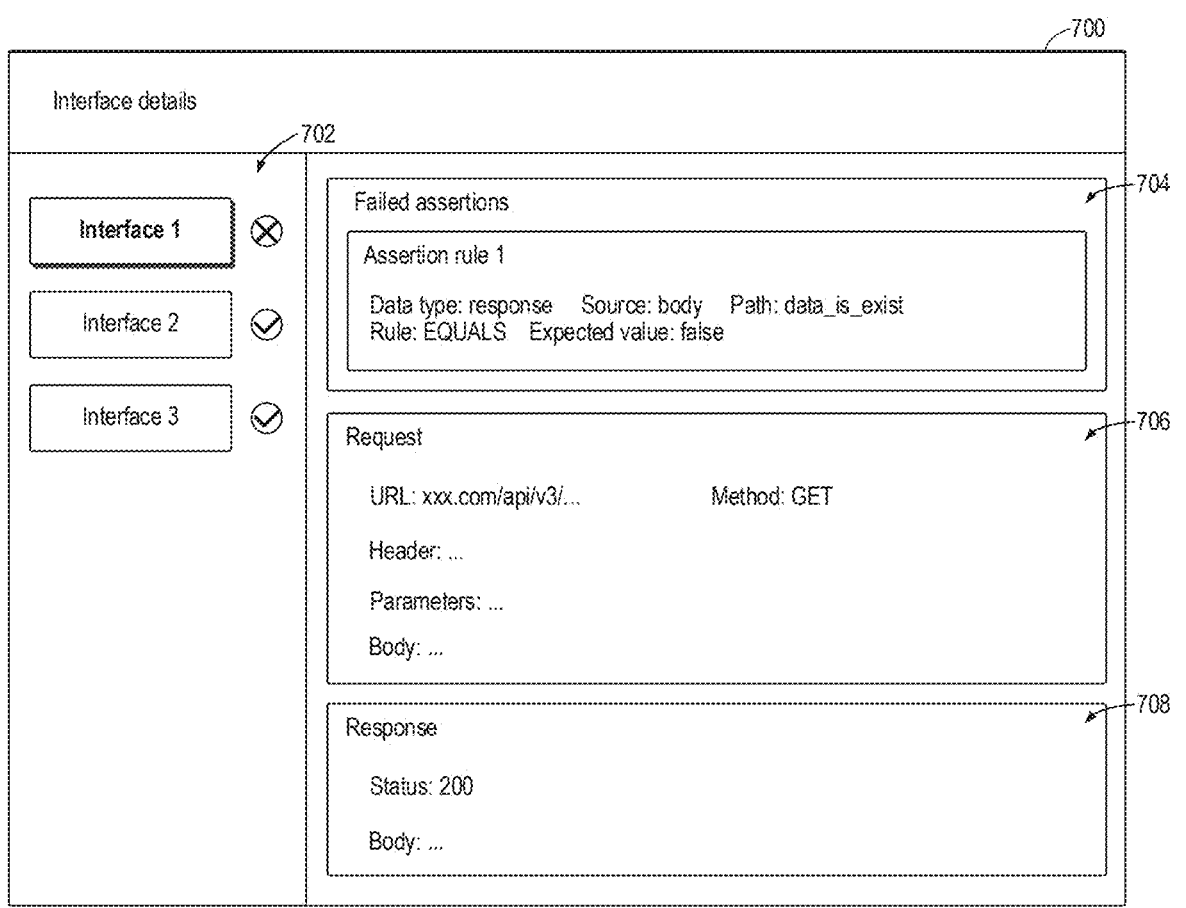
FIG. 7 is a schematic diagram illustrating an example UI showing interface verification results according to some embodiments of the present disclosure.

FIG. 7 is a schematic diagram illustrating an example UI 700 showing interface verification results according to some embodiments of the present disclosure. As shown in FIG. 7, the UI 700 may include an area 702 for displaying a list of backend interfaces, an area 704 for displaying verification results and assertion results, an area 706 for displaying data of a request, and an area 708 for displaying data of a response. In the area 702, all backend interfaces and verification results of these backend interfaces may be displayed. In this way, the user can easily view the verification results, and quickly locate the backend interfaces that have failed the verification. Furthermore, the user may view detailed information of the interface by triggering a control corresponding to the failed interface. For example, as shown in FIG. 7, an interface 1 has failed the verification, and a control corresponding to the interface 1 is triggered. Then, the detailed information of the interface 1 may be displayed in the areas 704, 706, and 708.

As shown in FIG. 7, in the area 704, failed assertion rules and the configuration of these assertion rules may be displayed. Furthermore, data of the request may be displayed in the area 706, and data of the response corresponding to the request may be displayed in the area 708. In this way, the user may quickly locate the data causing the failed assertion, thereby the efficiency of code debugging can be improved.

By utilizing the UI 600 and the UI 700, users only need to configure rules through the UI, without writing any code, which significantly reduces the technical difficulty of testing. Since there is no need to write and maintain complex test scripts, the time spent on script maintenance can be reduced. Furthermore, configuring rules through the UI allows for quick test setup, saving the time required for writing and debugging test scripts. The automated generation and management of mock data can eliminate the tedious process of manual data creation, improving the efficiency of test preparation and execution. The UI can provide an intuitive display of all request and response data from interfaces, allowing users to immediately see which interfaces have passed the verifications and which have not. The test results displayed through the UI enable quick identification and location of problematic interfaces and data, facilitating timely fixes. The system supports a variety of validation rules (such as data types, value ranges, and required fields), ensuring the completeness and accuracy of interface data. It also supports dynamic generation of mock data, simulating various interface response scenarios, thereby enhancing the comprehensiveness and reliability of testing. Users can flexibly configure and modify test rules according to their needs without having to rewrite or redeploy code. In addition, the system can easily integrate new rules and mock data generation logic, meeting the evolving demands of testing.

Figure 8:
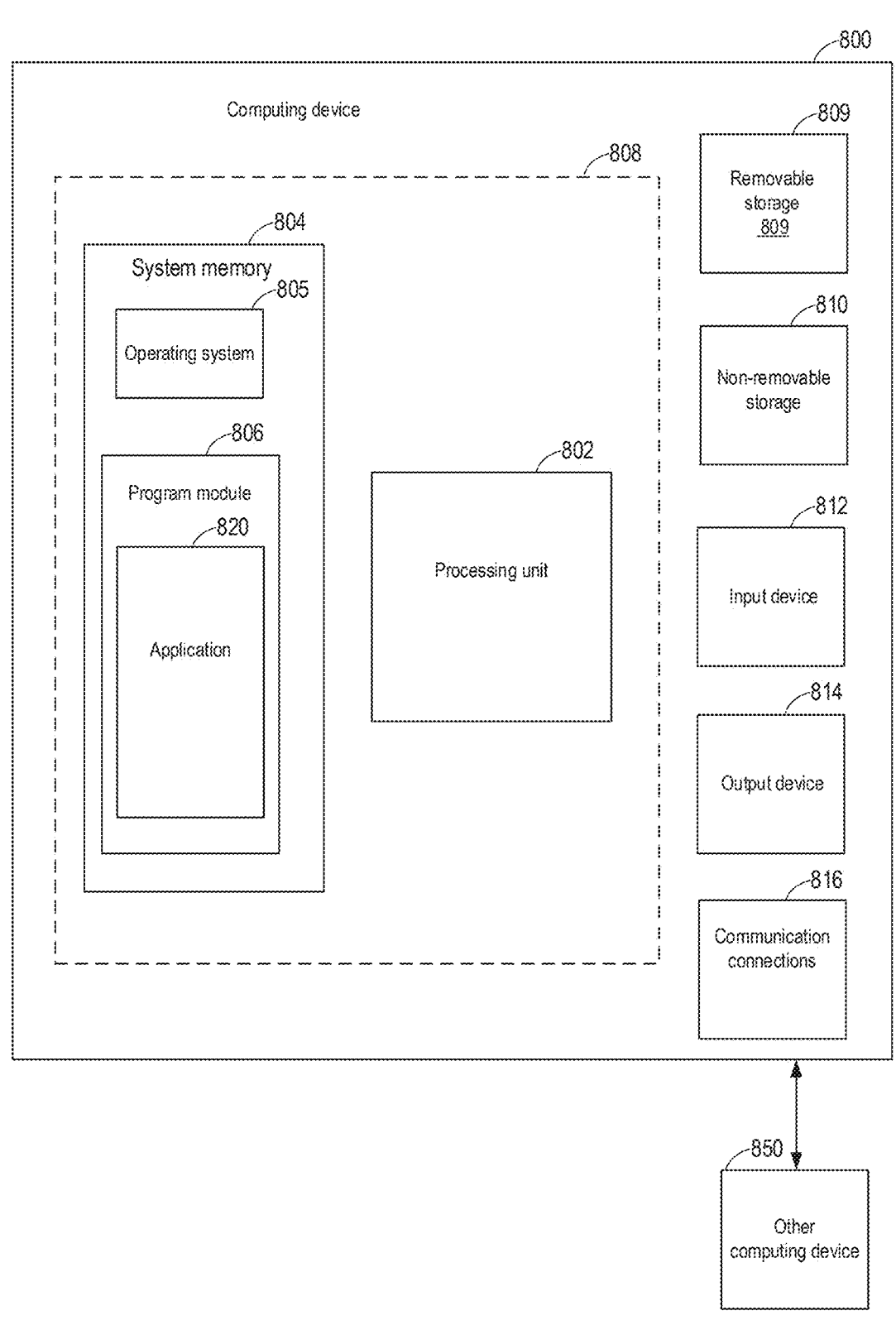
FIG. 8 is a block diagram illustrating physical components (for example hardware) of an electronic device with which aspects of the present disclosure may be practiced.

FIG. 8 is a block diagram illustrating physical components (e.g., hardware) of an electronic device 800 with which aspects of the disclosure may be practiced. For example, the electronic device 800 may implements the processes as depicted in FIGS. 1-7. In a basic configuration, the processing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories.

The system memory 804 may include an operating system 805 and one or more program modules 806 suitable for performing the various aspects disclosed herein such. The operating system 805, for example, may be suitable for controlling the operation of the processing device 800. Furthermore, aspects of the disclosure may be practiced in conjunction with other operating systems, or any other application program and is not limited to any particular application or system. This basic configuration is illustrated in FIG. 8 by those components within a dashed line 808. The processing device 800 may have additional features or functionality. For example, the processing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, several program modules and data files may be stored in the system memory 804. While executing on the at least one processing unit 802, an application 820 or program modules 806 may perform processes including, but not limited to, one or more aspects, as described herein. The application 820 may include an application interface

821 which may be the same as or similar to the application interface 821 as previously described in more detail with regard to FIGS. 1-7. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the processing device 500 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The processing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The processing device 800 may include one or more communication connections allowing communications with other computing or processing devices 850. Examples of suitable communication connections include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the processing device 800. Any such computer storage media may be part of the processing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a non-transitory storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, sub-combinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A method for verifying a backend interface, comprising:

receiving a request associated with the backend interface;

generating a mock response based on the request and a mock rule corresponding to the backend interface, the mock rule being received through a user interface;

obtaining an assertion rule corresponding to the backend interface, the assertion rule being received through the user interface, wherein the assertion rule comprises a data path indicating a path of data to be verified, a verification rule indicating a verification operation, and an expected value; and generating a verification result for display based on the mock response and the assertion rule, wherein generating the verification result for display based on the mock response and the assertion rule comprises:

applying the verification rule to the data to be verified and the expected value; and determining whether the data to be verified and the expected value satisfy the verification rule.

2. The method according to claim 1, further comprises:

pre-loading a plurality of mock rules from a database; and obtaining the mock rule from the pre-loaded plurality of mock rules.

3. The method according to claim 1, wherein the mock rule received through the user interface comprises a mock header and a mock body.

4. The method according to claim 1, wherein generating the verification result for display based on the mock response and the assertion rule comprises:

obtaining a plurality of assertion rules corresponding to the backend interface, the plurality of assertion rules being received through the user interface, and the plurality of assertion rules comprising the assertion rule; and determining that the backend interface is verified in response to all assertion rules pass.

5. The method according to claim 1, wherein the assertion rule received through the user interface further comprises at least one of:

a data type indicating whether the data to be verified is a request or a response, or a data source indicating whether a source of the data to be verified is headers, body, or query parameters.

6. The method according to claim 1, further comprising:

displaying, through the user interface, a plurality of backend interfaces and a plurality of verification results corresponding to the plurality of backend interfaces, wherein the plurality of verification results comprises the verification result of the backend interface, and the verification result indicates that a verification of the backend interface is successful or unsuccessful.

7. The method according to claim 1, wherein generating the mock response based on the request and the mock rule corresponding to the backend interface comprises:

obtaining a proxy rule corresponding to the backend interface, the proxy rule indicating an actual destination to which the request is sent, and the proxy rule being received through the user interface;

determining that the actual destination is a mock based on the proxy rule; and generating the mock response based on the request and the mock rule.

8. The method according to claim 7, further comprises:

determining that the actual destination is an isolation environment based on the proxy rule;

modifying a path of the backend interface to access the isolation environment;

generating a response from the isolation environment based on the request; and generating a verification result based on the response and the assertion rule.

9. The method according to claim 1, wherein the assertion rule comprises encoded data, and the method further comprises:

obtaining a piece of code for decoding the encoded data in the assertion rule, the piece of code being received through the user interface; and decoding the encoded data in the assertion rule using the piece of code.

10. The method according to claim 1, further comprising:

generating a hash value for rules associated with a verification task based on an identification of a verification step and an identification of the verification task; and loading the rules associated with the verification task into a part of instances of verification engine; and performing the verification task on the part of instances of verification engine based on the loaded rules.

11. The method according to claim 1, wherein generating the mock response based on the request and the mock rule corresponding to the backend interface comprises:

determining that the request matches the backend interface based on a matching rule, the matching rule being received through a user interface;

obtaining the mock rule corresponding to the backend interface; and generating the mock response based on the request and the mock rule.

12. The method according to claim 11, wherein determining that the request matches the backend interface based on the matching rule comprises:

obtaining a plurality of matching rules, a plurality of assertion rules and a mock rule corresponding to the backend interface, the plurality of matching rules being received through the user interface, and the plurality of matching rules comprising the matching rule; and determining that the request matches the backend interface in response to any of the plurality of matching rules being satisfied.

13. An electronic device, comprising:

a memory and a processor;

wherein the memory is configured to store one or more computer instructions which, when executed by the processor, cause the processor to:

receive a request associated with the backend interface;

generate a mock response based on the request and a mock rule corresponding to the backend interface, the mock rule being received through a user interface;

obtain an assertion rule corresponding to the backend interface, the assertion rule being received through the user interface, wherein the assertion rule comprises a data path indicating a path of data to be verified, a verification rule indicating a verification operation, and an expected value; and generate a verification result for display based on the mock response and the assertion rule, wherein the instructions causing the processor to generate the verification result for display based on the mock response and the assertion rule comprise instructions causing the processor to:

apply the verification rule to the data to be verified and the expected value; and determine whether the data to be verified and the expected value satisfy the verification rule.

14. The device according to claim 13, the instructions further causing the processor to:

pre-load a plurality of mock rules from a database; and obtain the mock rule from the pre-loaded plurality of mock rules.

15. The device according to claim 13, wherein the mock rule received through the user interface comprises a mock header and a mock body.

16. The device according to claim 13, wherein the instructions causing the processor to generate the verification result for display based on the mock response and the assertion rule comprise instructions causing the processor to:

obtain a plurality of assertion rules corresponding to the backend interface, the plurality of assertion rules being received through the user interface, and the plurality of assertion rules comprising the assertion rule; and determine that the backend interface is verified in response to all assertion rules pass.

17. The device according to claim 13, wherein the assertion rule received through the user interface further comprises at least one of:

a data type indicating whether the data to be verified is a request or a response, or a data source indicating whether a source of the data to be verified is headers, body, or query parameters.

18. The device according to claim 13, the instructions further causing the processor to:

display, through the user interface, a plurality of backend interfaces and a plurality of verification results corresponding to the plurality of backend interfaces, wherein the plurality of verification results comprises the verification result of the backend interface, and the verification result indicates that a verification of the backend interface is successful or unsuccessful.

19. The device according to claim 13, wherein the instructions causing the processor to generate the mock response based on the request and the mock rule corresponding to the backend interface comprise instructions causing the processor to:

obtain a proxy rule corresponding to the backend interface, the proxy rule indicating an actual destination to which the request is sent, and the proxy rule being received through the user interface;

determine that the actual destination is a mock based on the proxy rule; and generate the mock response based on the request and the mock rule.

20. A non-transitory computer-readable medium comprising instructions stored thereon which, when executed by a processor, cause the processor to:

receive a request associated with the backend interface;

generate a mock response based on the request and a mock rule corresponding to the backend interface, the mock rule being received through a user interface;

obtain an assertion rule corresponding to the backend interface, the assertion rule being received through the user interface, wherein the assertion rule comprises a data path indicating a path of data to be verified, a verification rule indicating a verification operation, and an expected value; and generate a verification result for display based on the mock response and the assertion rule, wherein the instructions causing the processor to generate the verification result for display based on the mock response and the assertion rule comprise instructions causing the processor to:

apply the verification rule to the data to be verified and the expected value; and determine whether the data to be verified and the expected value satisfy the verification rule.

* * * * *